United States Patent
Byun et al.

(10) Patent No.: US 10,877,185 B2
(45) Date of Patent: Dec. 29, 2020

(54) ANTIREFLECTION FILM AND METHOD FOR PREPARING SAME

(71) Applicant: LG CHEM, LTD., Seoul (KR)

(72) Inventors: Jin Seok Byun, Daejeon (KR); Jae Young Kim, Daejeon (KR); Yeong Rae Chang, Daejeon (KR); Yun U Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 219 days.

(21) Appl. No.: 16/087,023

(22) PCT Filed: Sep. 27, 2017

(86) PCT No.: PCT/KR2017/010732
§ 371 (c)(1),
(2) Date: Sep. 20, 2018

(87) PCT Pub. No.: WO2018/062855
PCT Pub. Date: Apr. 5, 2018

(65) Prior Publication Data
US 2019/0101670 A1 Apr. 4, 2019

(30) Foreign Application Priority Data

Sep. 27, 2016 (KR) .................. 10-2016-0124106
Oct. 20, 2016 (KR) .................. 10-2016-0136734
Jan. 20, 2017 (KR) .................. 10-2017-0009886

(51) Int. Cl.
| | |
|---|---|
| G02B 1/14 | (2015.01) |
| G01N 23/207 | (2018.01) |
| G02B 1/04 | (2006.01) |
| G02B 5/02 | (2006.01) |
| G02B 1/113 | (2015.01) |
| G01J 4/02 | (2006.01) |
| G01N 21/21 | (2006.01) |
| G01N 23/20 | (2018.01) |
| C03C 17/36 | (2006.01) |
| G02B 1/11 | (2015.01) |
| G02B 1/116 | (2015.01) |
| G02F 1/1335 | (2006.01) |

(52) U.S. Cl.
CPC ............ *G02B 1/14* (2015.01); *C03C 17/3618* (2013.01); *G01J 4/02* (2013.01); *G01N 21/21* (2013.01); *G01N 21/211* (2013.01); *G01N 23/20* (2013.01); *G01N 23/207* (2013.01); *G02B 1/04* (2013.01); *G02B 1/11* (2013.01); *G02B 1/113* (2013.01); *G02B 1/116* (2013.01); *G02B 5/0242* (2013.01); *G02B 5/0247* (2013.01); *C03C 2217/734* (2013.01); *G02F 1/133502* (2013.01); *Y10S 977/773* (2013.01)

(58) Field of Classification Search
CPC .......... G02B 1/14; G02B 1/113; G02B 1/116; G02B 1/11; G02B 1/04; G02B 5/0242; G02B 5/0247; G01J 4/02; G01N 21/21; G01N 23/20; G01N 21/211; G01N 23/207; C03C 17/3618; C03C 2217/734; Y10S 977/773; G02F 1/133502
See application file for complete search history.

(56) References Cited

U.S. PATENT DOCUMENTS

| | | | |
|---|---|---|---|
| 6,838,197 | B2 | 1/2005 | Nakajima et al. |
| 8,066,390 | B2 | 11/2011 | Asakura et al. |
| 8,240,859 | B2 | 8/2012 | Asakura et al. |
| 8,389,049 | B2 | 3/2013 | Asahi et al. |
| 8,840,257 | B2 | 9/2014 | Kawagishi et al. |
| 9,158,044 | B2 | 10/2015 | Akiyama et al. |
| 10,059,622 | B2 | 8/2018 | Liang et al. |
| 10,234,599 | B2 | 3/2019 | Byun et al. |
| 2002/0090521 | A1 | 7/2002 | Nakajima et al. |
| 2004/0209056 | A1 | 10/2004 | Oguri |
| 2004/0253427 | A1 | 12/2004 | Yokogawa et al. |
| 2007/0195412 | A1 | 8/2007 | Oya et al. |
| 2007/0285776 | A1 | 12/2007 | Nakamura et al. |
| 2007/0286993 | A1 | 12/2007 | Radcliffe et al. |
| 2009/0246415 | A1 | 10/2009 | Horie et al. |
| 2012/0200933 | A1 | 8/2012 | Akiyama et al. |
| 2013/0143028 | A1* | 6/2013 | Asahi .................. G02B 5/3033 428/310.5 |
| 2013/0196140 | A1 | 8/2013 | Lewis et al. |
| 2014/0004304 | A1 | 1/2014 | Yu et al. |
| 2014/0030429 | A1 | 1/2014 | Aben et al. |
| 2014/0186613 | A1 | 7/2014 | Liang et al. |

(Continued)

FOREIGN PATENT DOCUMENTS

| | | |
|---|---|---|
| CN | 1922266 A | 2/2007 |
| CN | 101467075 A | 6/2009 |

(Continued)

OTHER PUBLICATIONS

Extended European Search Report issued for European Patent Application No. 17856741.8. dated Nov. 30, 2018, 6 pages.
Extended European Search Report issued for European Patent Application No. 17856742.6 dated Dec. 20, 2018, 6 pages.
International Search Report and Written Opinion issued for International Application No. PCT/KR2017/010732 dated Jan. 11, 2018, 11 pages.
International Search Report and Written Opinion issued for International Application No. PCT/KR2017/010733 dated Jan. 11, 2018, 10 pages.
International Search Report and Written Opinion issued for International Application No. PCT/KR2017/010735 dated Jan. 11, 2018, 10 pages.

(Continued)

*Primary Examiner* — Robert E. Tallman
(74) *Attorney, Agent, or Firm* — Rothwell, Figg, Ernst & Manbeck, P.C.

(57) ABSTRACT

The present invention relates to an antireflection film being capable of realizing high scratch resistance and antifouling property while simultaneously having low reflectivity and high light transmittance, and further being capable of enhancing screen sharpness of a display device, and a method for preparing the antireflection film.

18 Claims, No Drawings

(56) References Cited

U.S. PATENT DOCUMENTS

| | | |
|---|---|---|
| 2015/0062713 A1 | 3/2015 | Hart et al. |
| 2015/0079348 A1 | 3/2015 | Mizoshita et al. |
| 2015/0177426 A1 | 6/2015 | Sakoske et al. |
| 2015/0355382 A1 | 12/2015 | Henn et al. |
| 2016/0320533 A1 | 11/2016 | Schmidt |
| 2018/0106929 A1 | 4/2018 | Song et al. |

FOREIGN PATENT DOCUMENTS

| | | |
|---|---|---|
| CN | 103370286 A | 10/2013 |
| EP | 3248776 A | 11/2017 |
| JP | S62-047601 A | 3/1987 |
| JP | 2003-098304 A | 4/2003 |
| JP | 2005-266051 A | 9/2005 |
| JP | 2006-049296 A | 2/2006 |
| JP | 3853624 B2 | 12/2006 |
| JP | 2007-121993 A | 5/2007 |
| JP | 2007-272131 A | 10/2007 |
| JP | 2007-272132 A | 10/2007 |
| JP | 2009-217258 A | 9/2009 |
| JP | 2010-078886 A | 4/2010 |
| JP | 2012-150226 A | 8/2012 |
| JP | 5175672 B2 | 4/2013 |
| JP | 2014-041249 A | 3/2014 |
| JP | 2015-084029 A | 4/2015 |
| JP | 5789951 B2 | 10/2015 |
| KR | 10-2003-0048022 A | 6/2003 |
| KR | 10-2004-0073627 A | 8/2004 |
| KR | 10-2006-0044595 A | 5/2006 |
| KR | 10-2012-0093212 A | 8/2012 |
| KR | 10-2013-0047634 A | 5/2013 |
| KR | 10-2015-0042780 A | 4/2015 |
| KR | 10-2016-0099903 A | 8/2016 |
| WO | 2000-00855 A1 | 1/2000 |
| WO | 2012-147527 A1 | 11/2012 |

OTHER PUBLICATIONS

Mi Jang and Hoichang Yang; "Structural Analyses of Semicrystalline Organic Thin Films by Using Atomic Force Microscopy(AFM) and Grazing-Incidence X-ray Diffraction(GIXD);" Polymer Science and Technology; vol. 20; No. 6; pp. 601-612 (Dec. 2009).
European Search Report issued for European Patent Application No. 17856744.2 dated Apr. 8, 2019, 6 pages.

* cited by examiner

ANTIREFLECTION FILM AND METHOD FOR PREPARING SAME

TECHNICAL FIELD

This application is a 35 U.S.C. § 371 National Phase Entry Application from PCT/KR2017/070732, filed on Sep. 27, 2017, and designating the United States, which claims priority to and the benefit of Korean Patent Application No. 10-2016-0124106 filed on Sep. 27, 2016, Korean Patent Application No. 10-2016-0136734 filed on Oct. 20, 2016, and Korean Patent Application No. 10-2017-0009886 filed on Jan. 20, 2017 with the Korean Intellectual Property Office, the entire contents of which are incorporated herein by reference.

The present invention relates to an antireflection film and a method for preparing the same. More specifically, the present invention relates to an antireflection film being capable of realizing high scratch resistance and antifouling property while simultaneously having low reflectivity and high light transmittance, and further being capable of enhancing screen sharpness of a display device, and a method for preparing the antireflection film.

BACKGROUND ART

In general, a flat panel display device such as a PDP or an LCD is equipped with an antireflection film for minimizing reflection of light incident from the outside.

As methods for minimizing the reflection of light, a method (anti-glare: AG coating) in which a filler such as a ceramic fine particle is dispersed in a resin and coated onto a substrate film to impart irregularities; a method (anti-reflection: AR coating) of using interference of light by forming a plurality of layers having different refractive indexes on a substrate film; a method for mixing them; etc., exist.

Among them, in the case of the AG coating, the absolute amount of the reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have been recently conducted.

As for a film using the AR coating, a multi-layer structure in which a hard coating layer (high refractive index layer), a low reflective coating layer, and the like are laminated on a substrate film has been commercialized. However, the method of forming a plurality of layers as described above has disadvantages in that as the process for forming each layer is performed separately, interlayer adhesion force (interfacial adhesion) is weak and scratch resistance is low.

In addition, conventionally, in order to improve the scratch resistance of the low refractive index layer included in the antireflection film, a method of adding various particles with a size of nanometers (for example, particles of silica, alumina, zeolite, etc.) had been mainly attempted. However, when the nanometer-sized particles were used as described above, there was a limitation in increasing the scratch resistance while simultaneously lowering the reflectivity of the low reflective index layer, and the antifouling property of the surface of the low refractive index layer was greatly reduced due to the particles with a size of nanometers.

Accordingly, many studies have been conducted to reduce the absolute reflection amount of light incident from the outside and to improve the antifouling property together with the scratch resistance of the surface, but the degree of improvement in physical properties resulting therefrom is insufficient.

DISCLOSURE

Technical Problem

It is one object of the present invention to provide an antireflection film being capable of realizing high scratch resistance and antifouling property while simultaneously having low reflectivity and high light transmittance, and further being capable of enhancing screen sharpness of a display device.

It is another object of the present invention to provide a method for preparing an antireflection film having the above-mentioned properties.

Technical Solution

In one embodiment of the present invention, an antireflection film is provided, including: a hard coating layer or an antiglare layer; and a low refractive index layer formed on one side of the hard coating layer or the antiglare layer and including a binder resin, and hollow silica nanoparticles, metal oxide nanoparticles, and inorganic nanoparticles dispersed in the binder resin, wherein a first region containing the hollow silica nanoparticles, a second region containing the metal oxide nanoparticles, and a third region containing the inorganic nanoparticles are present in the low reflective index layer, and wherein the first region, the second region, and the third region satisfy the following Equation 1.

Refractive Index ($n1$) of First Region<Refractive Index ($n3$) of Third Region<Refractive Index ($n2$) of Second Region     [Equation 1]

Herein, n1, n2, and n3 are refractive indexes obtained by carrying out ellipsometry measurement at an incident angle of 70° over a wavelength range of 380 nm to 1000 nm.

In another embodiment of the present invention, a method for preparing an antireflection film is provided, including the steps of: coating a resin composition for forming a low refractive index layer containing a photocurable compound or its (co)polymer, a fluorine-containing compound containing a photoreactive functional group, a photoinitiator, hollow silica nanoparticles, metal oxide nanoparticles, and inorganic nanoparticles on a hard coating layer or an antiglare layer and drying the coated product at a temperature of 35° C. to 100° C.; and photocuring the dried product of the resin composition.

Hereinafter, the antireflection film and the method for preparing an antireflection film according to specific embodiments of the present invention will be described in more detail.

In the present disclosure, the photopolymerizable compound collectively refers to a compound which causes a polymerization reaction when irradiated with light, for example, when irradiated with visible light or ultraviolet light.

Further, the fluorine-containing compound refers to a compound containing at least one fluorine element in the compound.

Further, the (meth)acryl refers to including both acryl and methacryl.

Moreover, the (co)polymer refers to including both a co-polymer and a homo-polymer.

Furthermore, the hollow silica particles refer to silica particles derived from a silicon compound or an organosilicon compound, in which voids are present on the surface and/or inside of the silica particles.

According to one embodiment of the present invention, an antireflection film may be provided, including: a hard coating layer or an antiglare layer; and a low refractive index layer formed on one side of the hard coating layer or the antiglare layer and including a binder resin, and hollow silica nanoparticles, metal oxide nanoparticles, and inorganic nanoparticles dispersed in the binder resin, wherein a first region containing the hollow silica nanoparticles, a second region containing the metal oxide nanoparticles, and a third region containing the inorganic nanoparticles are present in the low reflective index layer, and wherein the first region, the second region, and the third region satisfy the following Equation 1.

Refractive Index (n1) of First Region<Refractive Index (n3) of Third Region<Refractive Index (n2) of Second Region  [Equation 1]

Herein, n1, n2, and n3 are refractive indexes obtained by carrying out ellipsometry measurement at an incident angle of 70° over a wavelength range of 380 nm to 1000 nm. The measured ellipsometry data ($\Psi$, $\Delta$) can be fitted to a Cauchy model of the following General Formula 1 using CompleteEASE software so that MSE becomes 5 or less, thereby measuring the reflective index.

$$n(\lambda) = A + \frac{B}{\lambda^2} + \frac{C}{\lambda^4}$$ [General Formula 1]

Conventionally, in order to reduce the reflective index of the antireflection film, inorganic particles having a low refractive index were added in an excess amount to realize the reflectivity properties. However, there has been a limit in that, as the use amount of the inorganic particles having a low refractive index is increased, mechanical properties such as the scratch resistance of the antireflection film are reduced.

Thus, the present inventors conducted intensive studies on the antireflection film, and found through experiments that, when hollow silica nanoparticles, metal oxide nanoparticles, and inorganic nanoparticles satisfying a specific diameter range in the low refractive layer included in the antireflection film are distributed so as to be distinguished into regions having mutually different refractive indexes, it is possible to realize high scratch resistance and antifouling property while simultaneously having low reflectivity and high light transmittance. The present invention has been completed on the basis of such finding.

Specifically, through the specific preparation method described later, when inorganic nanoparticles are mainly distributed close to the interface between the hard coating layer or the antiglare layer and the low refractive layer in the antireflection film, the hollow silica nanoparticles are mainly distributed toward the opposite surface of the interface and the metal oxide particles are mainly distributed between the inorganic nanoparticles and the hollow silica nanoparticles, and three or more regions or three or more layers having different refractive indexes can be formed in the low refractive layer, whereby a lower reflectivity can be achieved, and the low refractive layer can realize significantly improved scratch resistance and antifouling property together.

It appears that the specific distribution of the inorganic nanoparticles, the metal oxide nanoparticles, and the hollow silica nanoparticles in the low refractive index layer can be obtained by controlling the drying temperature of the photocurable resin composition for forming a low refractive layer containing the three types of nanoparticles, that is, inorganic nanoparticles, metal oxide nanoparticles, and hollow silica nanoparticles having different diameter ranges, as in a specific preparation method described later.

In addition, the antireflection film of one embodiment is prepared from a coating composition including at least two kinds of particles among the above-mentioned three kinds of nanoparticles and a binder resin, and on the final antireflection film obtained after drying of the coating composition, the first to third regions having different refractive indexes may be present in a single refractive index layer. Thus, a coating composition in which a binder resin is dispersed for each particle is prepared, and then sequentially coated to produce a film more quickly and easily than a conventional antireflection film in which a plurality of refractive index layers are present in the low refractive index layer, thereby improving the process efficiency and preventing peeling between the refractive index layers.

Hereinafter, the antireflection film of one embodiment will be described in more detail. The antireflection film of one embodiment may include a low refractive index layer formed on one side of the hard coating layer or the antiglare layer and including a binder resin, and hollow silica nanoparticles, metal oxide nanoparticles, and inorganic nanoparticles dispersed in the binder resin.

In particular, a first region containing hollow silica nanoparticles, a second region containing the metal oxide nanoparticles, and a third region containing the inorganic nanoparticles may be present in the low reflective index layer.

As used herein, the term "region" may be a part of the low refractive index layer such as a domain visually distinguished by a layer or a predetermined boundary. Specifically, within one region, the refractive index and related parameters (e.g., Cauchy parameters fitted to the Cauchy model) obtained by an ellipsometry method belong to the same category. Between different regions, the refractive index or related parameters are different enough to be clearly distinguished. For example, when the refractive indexes of the first region, the second region, and the third region included in the low refractive index layer are measured by the ellipsometry method, the refractive index values are measured to be the same in the first region. The refractive index values are the same even in the second region, and the refractive index values are the same even in the third region. However, the refractive index values between the first region, the second region, and the third region are different from each other.

More specifically, the first region may include 70% by volume or more of the entire hollow silica nanoparticles, the second region may include 70% by volume or more of the entire metal oxide nanoparticles, and the third region may include 70% by volume or more of the entire inorganic nanoparticles. The "70% by volume or more of the entire hollow silica nanoparticles are present in a specific first region" is used to mean that in the cross-section of the low refractive index layer, the majority of the hollow silica nanoparticles are mainly distributed or present in the first region, whereby the first region can exhibit a similar tendency to the optical properties of the hollow silica nanoparticles.

The "70% by volume or more of the entire metal oxide nanoparticles are present in a specific second region" is defined to mean that in the cross-section of the low refractive index layer, the majority of the metal oxide nanoparticles are mainly distributed or present in the second region, whereby the second region can exhibit a similar tendency to the optical properties of the metal oxide nanoparticles.

The "70% by volume or more of the entire inorganic nanoparticles are present in a specific third region" is defined to mean that in the cross-section of the low refractive index layer, the majority of the inorganic nanoparticles are mainly distributed or present in the third region, whereby the third region can exhibit a similar tendency to the optical properties of the inorganic nanoparticles.

Specifically, as an example of a method of identifying the kind of particles mainly distributed in each region, a method of measuring and comparing optical properties (for example, ellipsometry) for each region can be used. As described above, the optical properties of similar ranges are realized in the corresponding region depending on the optical properties of the particles mainly distributed in each region. In this regard, the information of the particles contained in each region can be identified through measurement and comparison of the optical properties of each region.

That is, in the antireflection film of one embodiment, three kinds of particles are dispersed in the low refractive index layer formed on the hard coating layer or the antiglare layer, and thus it is possible to form a specific region mainly located or distributed in the low refractive index layer for each particle. This region can be formed by spontaneous separation between three kinds of particles in a single low refractive index layer.

Meanwhile, the first region, the second region, and the third region included in the low refractive index layer may have different refractive indexes from each other. Specifically, the refractive index of each of the first region, the second region, and the third region may satisfy the following Equation 1.

Refractive Index ($n1$) of First Region<Refractive Index ($n3$) of Third Region<Refractive Index ($n2$) of Second Region    [Equation 1]

More specifically, the refractive index of the first region may be less than 1.4, the refractive index of the second region may be more than 1.55, and the refractive index of the third region may be more than 1.4 and less than 1.55. That is, the refractive index is decreased in the order of the second region, the third region, and the first region, and the refractive index of the third region is larger than the refractive index of the first region and smaller than the refractive index of the second region. Because of having such a characteristic refractive index distribution, it is possible to realize an antireflection film having lower reflectivity than a conventional one.

More specifically, when the polarization ellipticity measured by the ellipsometry method for the first region is fitted to a Cauchy model of the following General Formula 1, A may be 1.0 to 1.5. When the polarization ellipticity measured by the ellipsometry method for the second region is fitted to a Cauchy model of the following General Formula 1, A may be 1.2 to 3.0. When the polarization ellipticity measured by the ellipsometry method for the third region is fitted to a Cauchy model of the following General Formula 1, A may be 1.0 to 2.5.

$$n(\lambda) = A + \frac{B}{\lambda^2} + \frac{C}{\lambda^4}$$    [General Formula 1]

In the above General Formula 1, $n(\lambda)$ is a refractive index at a wavelength $\lambda$, $\lambda$ is in a range of 300 nm to 1800 nm, and A, B, and C are Cauchy parameters.

Further, in the low refractive index layer, the third region may be located closer to the interface between the hard coating layer or the antiglare layer and the low refractive index layer, compared to the second region, and the second region may be located closer to the interface between the hard coating layer or the antiglare layer and the low refractive layer, compared to the first region. That is, the first region, the second region, and the third region included in the low refractive index layer may be located closer to the interface between the hard coating layer or the antiglare layer and the low refractive index layer in the order of the third region, the second region, and the first region. More specifically, the third region may be located on the hard coating layer or the antiglare layer, the second region on the third region, and the first region on the second region.

The order of arranging each region in the low refractive index layer seems to depend on the diameter of the particles mainly included in each region. Specifically, the larger the diameter of the particles mainly contained in each region is, the more it is located away from the hard coating layer or the antiglare layer. The smaller the diameter of the particles mainly contained in each region is, the more it is located closer to the hard coating layer or the antiglare layer.

An example of a method capable of confirming the order of arranging each region in the low refractive index layer is not particularly limited, and a method of comparing the refractive indexes for each region obtained through ellipsometry measurement results of each region with respect to the low refractive index layer, with the refractive index of each of three kinds of particles contained in the low refractive index layer, can be used. As described later, the position of the region in the low refractive index layer can be determined by the average diameter of the particles mainly contained in the region, and the order of arranging each area can be confirmed through the average diameter and refractive index information of three kinds of particles dispersed in the low refractive index layer.

Thus, the antireflection film can realize lower reflectivity than the reflectivity which could be obtained by using inorganic particles in the past. Specifically, the antireflection film can exhibit ultra-low reflectivity of a remarkably low level such as 0.3% or less in the visible light wavelength band of 380 nm to 780 nm.

Further, the first region, the second region, and the third region of the low refractive index layer may be present in a continuous phase by one binder resin. The "is present in the continuous phase" means that the binder resin is distributed without forming a separated phase such as an interface or a layer. More specifically, it may mean that the low refractive index layer is prepared through a single coating with a resin composition including a binder resin, a hollow silica nanoparticle, a metal oxide nanoparticle, and an inorganic nanoparticle.

Conversely, in the conventional method of forming a multilayer structure by preparing the coating composition for forming each layer by the number of layers followed by sequentially coating and drying, a method of coating and drying the lower layer, followed by coating and drying the upper layer on the lower layer, is used, whereby a separated phase is formed, for example, an interface is formed between the lower layer and the upper layer, and the binder resin contained in the upper layer and the lower layer forms a separated phase rather than a continuous phase.

The thicknesses of the first region, the second region, and the third region may each independently be 10 nm to 200 nm. Examples of the method of measuring the thickness are not particularly limited, and for example, thickness data measured by an ellipsometry method can be used.

The inorganic nanoparticles include solid-type silica nanoparticles or antimony-doped tin oxide nanoparticles, and the solid-type silica nanoparticles mean particles composed of a silica material and having a form in which voids are not present therein. The refractive index of the inorganic nanoparticles may be 1.45 to 1.85 or 1.45 to 1.6.

Further, the metal oxide nanoparticles have an average diameter of 3 nm to 60 nm and mean particles composed of a metal oxide. Examples of the metal oxide are not particularly limited, and for example, a titanium oxide (such as titanium dioxide), a tin oxide (such as tin dioxide), zinc oxide, or the like can be used. The refractive index of the metal oxide nanoparticles may be 1.7 or more.

Further, the hollow silica nanoparticles mean particles having an average diameter of 10 nm to 200 nm, composed of a silica material, and having a form in which voids are present on the surface and/or inside thereof. The refractive index of the hollow silica nanoparticles may be 1.2 to 1.45.

The low refractive index layer may include 15% by weight to 70% by weight of the hollow silica nanoparticles, 10% by weight to 50% by weight of the metal oxide nanoparticles, and 3% by weight to 40% by weight of the inorganic nanoparticles, based on the total solid content. The solid content means only a solid component excluding a liquid component in the low refractive index layer, and a component such as an organic solvent that can be optionally contained as described later.

More specifically, the metal oxide nanoparticles are contained in an amount of 20 parts by weight to 60 parts by weight, and the inorganic nanoparticles are contained in an amount of 20 parts by weight to 40 parts by weight, based on 100 parts by weight of the hollow silica nanoparticles.

When the content of the hollow silica nanoparticles, the metal oxide nanoparticles, and the inorganic nanoparticles in the low refractive index layer is excessively high, in the course of preparing the low refractive index layer, phase separation between the hollow silica nanoparticles, the metal oxide nanoparticles, and the inorganic nanoparticles in the low refractive index layer does not sufficiently occur, and they are mixed. Thereby, the regions having different refractive indexes are not formed in the low refractive index layer, so that the reflectivity may be increased, and surface irregularities may be excessively generated and thus the antifouling property may be lowered. When the content of the hollow silica nanoparticles, the metal oxide nanoparticles, and the inorganic nanoparticles in the low refractive index layer is excessively small, it may be difficult for the majority of the inorganic nanoparticles and the metal oxide nanoparticles to locate from a region close to the interface between the hard coating layer or the antiglare layer and the low refractive index layer, and the reflectivity of the low refractive index layer may be greatly increased.

Meanwhile, each of the inorganic nanoparticles, the metal oxide nanoparticles, and the hollow silica nanoparticles may have at least one reactive functional group selected from the group consisting of a (meth)acrylate group, an epoxide group, a vinyl group, and a thiol group on the surface thereof. As each of the inorganic nanoparticles, the metal oxide nanoparticles and the hollow silica nanoparticles contain the above-described reactive functional group on the surface, the low refractive index layer can have a higher degree of crosslinking, thereby securing more improved scratch resistance and antifouling property.

More specifically, in the low reflective index layer, a ratio of the average diameter of the inorganic nanoparticles to the average diameter of the hollow silica nanoparticles may be 0.01 to 0.5. Accordingly, the hollow silica nanoparticles and the inorganic nanoparticles may exhibit mutually different uneven distribution and distribution patterns in the low refractive index layer. For example, the positions where each of the hollow silica nanoparticles and the inorganic nanoparticles is mainly distributed may be at mutually different distances on the basis of the interface between the hard coating layer or the antiglare layer and the low refractive layer.

The average diameter of the hollow silica nanoparticles and the average diameter of the inorganic nanoparticles may be, respectively, the average values obtained by measuring and calculating the diameters of the hollow silica nanoparticles and the inorganic nanoparticles identified by a TEM photograph (for example, magnification of 25,000 times) of the antireflection film.

In this manner, as the regions where the hollow silica nanoparticles and the inorganic nanoparticles are mainly distributed are varied in the low refractive layer, the low refractive index layer has a unique internal structure and arrangement pattern of components, thereby having lower reflectivity. In addition, as the regions where the hollow silica nanoparticles and the inorganic nanoparticles are mainly distributed are varied in the low refractive index layer, the surface properties of the low refractive index layer are also varied so that more improved scratch resistance and antifouling property can be realized.

On the contrary, when the difference between the diameter of the hollow silica nanoparticles contained in the low refractive index layer and the diameter of the inorganic nanoparticles is not so large, the hollow silica nanoparticles and the inorganic nanoparticles aggregate with each other and uneven distribution or distribution according to the type of particles does not occur. Therefore, not only it is difficult to greatly lower the reflectivity of the antireflection film, but also it may be difficult to achieve the desired scratch resistance and antifouling property.

As described above, the inherent effects of the antireflection film of the embodiment, for example, the properties that can realize high scratch resistance and antifouling property while simultaneously having low reflectivity and high light transmittance, and can further enhance the screen sharpness of the display device, depend on the ratio of the average diameter between the hollow silica nanoparticles and the inorganic nanoparticles described above.

As the ratio of the average diameter of the inorganic nanoparticles to the average diameter of the hollow silica nanoparticles described above satisfies the above-mentioned conditions, the antireflection film can realize high scratch resistance and antifouling property while simultaneously having low reflectivity and high light transmittance. In order to more easily adjust the properties of the antireflection film and match the properties required in the field of application, the hollow silica nanoparticles and the inorganic nanoparticles having a predetermined average diameter may be used.

For example, in order for the antireflection film to realize more improved high scratch resistance and antifouling property while simultaneously having low reflectivity and high light transmittance, the average diameter of the hollow silica nanoparticles may be in a range of 20 nm to 100 nm. Further, the average diameter of the inorganic nanoparticles may be in the range of 1 nm to 30 nm.

Moreover, the ratio of the average diameter of the inorganic nanoparticles to the average diameter of the metal oxide nanoparticles may be 0.5 to 0.9. Consequently, as the regions where the metal oxide nanoparticles and the inorganic nanoparticles are mainly distributed in the low refractive index layer are varied, the low refraction layer can have an inherent internal structure and arrangement pattern of components, thereby having lower reflectivity.

Specifically, as the ratio of the average diameter of the inorganic nanoparticles to the average diameter of the metal oxide nanoparticles satisfies the above-described range, the metal oxide nanoparticles in the low refractive index layer can be dispersed away from the interface between the hard coating layer or the antiglare layer and the low refraction layer.

More specifically, the average diameter of the metal oxide nanoparticles may be larger than the average diameter of the inorganic nanoparticles and smaller than the average diameter of the hollow silica nanoparticles. That is, the average diameter of the hollow silica nanoparticles, the metal oxide nanoparticles, and the inorganic nanoparticles can satisfy the following Equation 2.

Average Diameter of Inorganic Nanoparticles<Average Diameter of Metal Oxide Nanoparticles<Average Diameter of Hollow Silica Nanoparticles  [Equation 2]

More specifically, the metal oxide nanoparticles may have longer diameters by 1 nm or more, or 5 nm to 20 nm, compared with the metal nanoparticles, and due to the difference in diameter, in the low refractive index layer formed on the hard coating layer or the antiglare layer, the inorganic nanoparticles can be mainly dispersed closer to the hard coating layer or the antiglare layer compared to the metal oxide nanoparticles. Thereby, the low refractive index layer realizes ultra-low reflectivity and at the same time improved mechanical properties such as scratch resistance.

In addition, the hollow silica nanoparticles may have longer diameters by 15 mm or more, 15 nm to 60 nm, or 30 nm to 55 nm than the metal oxide nanoparticles, and due to the difference in diameter, in the low refractive index layer formed on the hard coating layer or the antiglare layer, the metal oxide nanoparticles can be mainly dispersed closer to the hard coating layer or the antiglare layer than the hollow silica nanoparticles. Thereby, it is possible to realize improved scratch resistance and antifouling property on the surface of the low refraction layer.

Meanwhile, the above-described low refractive index layer can be produced from a photocurable coating composition containing a photopolymerizable compound, a fluorine-containing compound containing a photoreactive functional group, hollow silica nanoparticles, metal oxide nanoparticles, inorganic nanoparticles, and a photoinitiator.

Accordingly, the binder resin contained in the low refractive index layer may include a crosslinked (co)polymer between a (co)polymer of a photopolymerizable compound and a fluorine-containing compound containing a photoreactive functional group.

The photopolymerizable compound contained in the photocurable coating composition of this embodiment can form a substrate of the binder resin of the low refractive index layer to be produced. Specifically, the photopolymerizable compound may include a monomer or an oligomer including a (meth)acrylate or a vinyl group. More specifically, the photopolymerizable compound may include a monomer or an oligomer containing one or more, or two or more, or three or more of (meth)acrylates or vinyl groups.

Specific examples of the monomer or oligomer containing (meth)acrylate include pentaerythritol tri(meth)acrylate, pentaerythritol tetra(meth)acrylate, dipentaerythritol penta (meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri (meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof. Herein, the molecular weight of the oligomers (weight average molecular weight in terms of polystyrene measured by the GPC method) is preferably 1000 to 10,000.

Specific examples of the monomer or oligomer containing a vinyl group may include divinylbenzene, styrene, and para-methyl styrene.

The content of the photopolymerizable compound in the photocurable coating composition is not particularly limited. However, considering the mechanical properties of the finally produced low refractive index layer or antireflection film, the content of the photopolymerizable compound in the solid content of the photocurable coating composition may be 5% by weight to 60% by weight. The solid content of the photocurable coating composition means only a solid component, excluding a liquid component in the low refractive index layer, for example, a component such as an organic solvent which may be optionally included as described below.

On the other hand, the photopolymerizable compound may further include a fluorine-based (meth)acrylate-based monomer or oligomer in addition to the monomer or oligomer described above. When the fluorine-based (meth)acrylate-based monomer or oligomer is further included, the weight ratio of the fluorine-based (meth)acrylate-based monomer or oligomer to the monomer or oligomer containing a (meth)acrylate or vinyl group may be 0.1% to 10%.

Specific examples of the fluorine-based (meth)acrylate-based monomer or oligomer include at least one compound selected from the group consisting of the following Chemical Formulae 11 to 15.

[Chemical Formula 11]

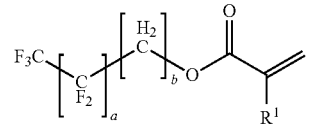

In the above Formula 11, $R^1$ is a hydrogen group, or an alkyl group having 1 to 6 carbon atoms, a is an integer of 0 to 7, and b is an integer of 1 to 3.

[Chemical Formula 12]

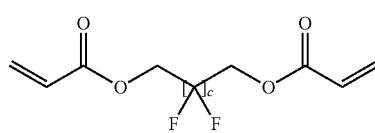

In the above Formula 12, c is an integer of 1 to 10.

[Chemical Formula 13]

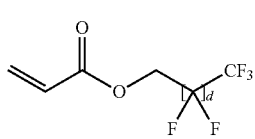

In the above Formula 13, d is an integer of 1 to 11.

[Chemical Formula 14]

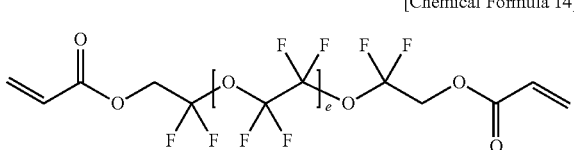

In the above Formula 14, e is an integer of 1 to 5.

[Chemical Formula 15]

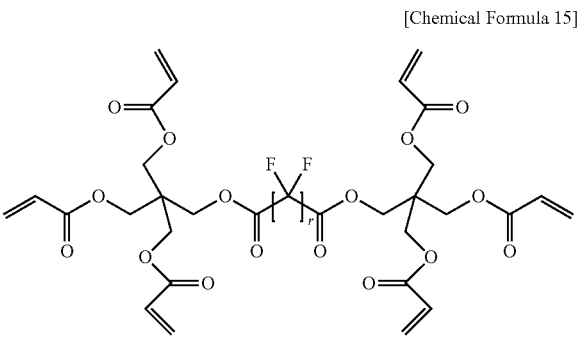

In the above Formula 15, f is an integer of 4 to 10.

On the other hand, the low refractive index layer may include a portion derived from the fluorine-containing compound containing the photoreactive functional group.

One or more photoreactive functional groups may be contained or substituted in fluorine-containing compounds containing the photoreactive functional group. The photoreactive functional group means a functional group capable of participating in the polymerization reaction by irradiation with light, for example, by irradiation with visible light or ultraviolet light. The photoreactive functional group may include various functional groups known to be capable of participating in the polymerization reaction by irradiation with light. Specific examples thereof include a (meth)acrylate group, an epoxide group, a vinyl group, and a thiol group.

Each of the fluorine-containing compounds containing the photoreactive functional group may have a weight average molecular weight (weight average molecular weight in terms of polystyrene measured by GPC method) of 2000 to 200,000, preferably 5000 to 100,000.

If the weight average molecular weight of the fluorine-containing compound containing the photoreactive functional group is too small, the fluorine-containing compound in the photocurable coating composition cannot be uniformly and effectively arranged on the surface and is located inside the low refractive index layer finally produced. Thus, the antifouling property that the surface of the low refractive index has is lowered and the crosslinking density of the low refractive index layer is lowered, so that the overall mechanical properties such as the strength and the scratch resistance may be deteriorated.

In addition, if the weight average molecular weight of the fluorine-containing compound containing the photoreactive functional group is too high, the compatibility with other components in the photocurable coating composition may be lowered, and thus the haze of the low refractive index layer finally produced may be increased or the light transmittance may be lowered, and the strength of the low refractive index layer may also be lowered.

Specifically, the fluorine-containing compound containing the photoreactive functional group includes: i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted for at least one silicon; iv) a polyether compound in which at least one photoreactive functional group is substituted and at least one hydrogen is substituted with fluorine; or a mixture of two or more of i) to iv) or copolymers thereof.

The photocurable coating composition may contain 20 parts by weight to 300 parts by weight of the fluorine-containing compound containing the photoreactive functional group based on 100 parts by weight of the photopolymerizable compound. Considering the mechanical properties of the finally produced low refractive index layer and antireflection film, the content of the fluorine-containing compound containing the photoreactive functional group in the solid content of the photocurable coating composition may be 1% by weight to 30% by weight.

When the fluorine-containing compound containing the photoreactive functional group is excessively added relative to the photopolymerizable compound, the coating property of the photocurable coating composition of the embodiment may be lowered, or the low refractive index layer obtained from the photocurable coating composition may not have sufficient durability or scratch resistance. Further, when the amount of the fluorine-containing compound containing the photoreactive functional group is too small relative to the photopolymerizable compound, the low refractive index layer obtained from the photocurable coating composition may not have mechanical properties such as sufficient antifouling property and scratch resistance.

The fluorine-containing compound containing the photoreactive functional group may further contain silicon or a silicon compound. That is, the fluorine-containing compound containing a photoreactive functional group can optionally contain silicon or a silicon compound therein. Specifically, the content of silicon in the fluorine-containing compound containing the photoreactive functional group may be 0.1% by weight to 20% by weight.

The silicon contained in the fluorine-containing compounds containing the photoreactive functional group can increase the compatibility with other components contained in the photocurable coating composition of the embodiment, whereby it can prevent the generation of haze on the finally produced refractive layer and serve to enhance transparency. On the other hand, if the content of silicon in the fluorine-containing compounds containing the photoreactive functional group is too large, compatibility between the other components contained in the photocurable coating composition and the fluorine-containing compound may be rather lowered, whereby the finally produced low refractive index layer and antireflection film may not have sufficient light transmittance and antireflection performance, and thus the antifouling property of the surface may also be lowered.

The low refractive index layer may have a thickness of 1 nm to 300 nm, or 50 nm to 200 nm.

Meanwhile, as the hard coating layer or the antiglare layer, a hard coating layer or an antiglare layer commonly known in the art can be used without particular limitation.

As an example of the hard coating film, a hard coating film or antiglare layer containing a binder resin of a photocurable resin, and an antistatic agent dispersed in the binder resin, can be mentioned.

The photocurable resin contained in the hard coating layer or the antiglare layer may be a polymer of a photocurable compound capable of causing a polymerization reaction when irradiated with light such as an ultraviolet light or the like, and may be one that is conventional in the relevant art. However, preferably, the photocurable compound may be a polyfunctional (meth)acrylate-based monomer or oligomer. In this case, it is advantageous for the number of (meth)acrylate-based functional groups to be 2 to 10, preferably 2 to 8, and more preferably, 2 to 7, in terms of securing the physical properties of the hard coating layer.

Alternatively, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The antistatic agent may be: quaternary ammonium salt compounds; pyridinium salts; cationic compounds having 1 to 3 amino groups; anionic compounds such as a sulfonic acid base, a sulfuric ester base, a phosphoric ester base, a phosphonic acid base, and the like; amphoteric compounds such as amino acid-based or aminosulfuric acid ester-based compounds; nonionic compounds such as imino alcohol-based compounds, glycerin-based compounds, polyethylene glycol-based compounds, and the like; organometallic compounds such as metal alkoxide compounds including tin, titanium, or the like; metal oxide chelate compounds such as an acetylacetonate salt of the organometallic compounds; two or more reactants or polymers of these compounds; and a mixture of two or more of these compounds. Herein, the quaternary ammonium salt compound may be a compound having at least one quaternary ammonium salt group in the molecule, and a low-molecule type or a high-molecule type can be used without limitation.

Further, as the antistatic agent, a conductive polymer and metal oxide fine particles may also be used. The conductive polymer may include aromatic conjugated poly(paraphenylene), heterocyclic conjugated polypyrrole, polythiophene, aliphatic conjugated polyacetylene, a conjugated polyaniline containing a hetero atom, a mixed-type conjugated poly(phenylene vinylene), a conjugated double-chain type conjugated compound having a plurality of conjugated chains in the molecule, a conductive complex obtained by graft or block copolymerization of a conjugated polymer chain with a saturated polymer, and the like. Furthermore, the metal oxide fine particles include zinc oxide, antimony oxide, tin oxide, cerium oxide, indium tin oxide, indium oxide, aluminum oxide, antimony doped-tin oxide, aluminum doped-zinc oxide, and the like.

The hard coating film or the antiglare layer including a binder resin of the photocurable resin, and an antistatic agent dispersed in the binder resin, may further include at least one compound selected from the group consisting of an alkoxysilane-based oligomer and a metal alkoxide-based oligomer.

The alkoxysilane-based compound may be one that is conventional in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer.

However, since the metal alkoxide-based compound can rapidly react with water, the sol-gel reaction can be performed by a method of diluting the metal alkoxide-based compound in an organic solvent and then slowly dripping water thereto. At this time, considering the reaction efficiency or the like, the molar ratio (based on metal oxide ions) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

The hard coating film or the antiglare layer may have a thickness of 0.1 μm to 100 μm.

A substrate bonded to the other side of the hard coating layer or the antiglare layer can be further included. The specific type and thickness of the substrate are not particularly limited, and any substrate known to be usable in the production of a low refractive index layer or antireflection film may be used without particular limitation.

On the other hand, according to another embodiment of the present invention, a method for preparing an antireflection film may be provided, including the steps of: coating a resin composition for forming a low refractive index layer containing a photocurable compound or its (co)polymer, a fluorine-containing compound containing a photoreactive functional group, a photoinitiator, a hollow silica nanoparticle, a metal oxide nanoparticle, and an inorganic nanoparticle on the hard coating layer or the antiglare layer and drying the coated resin composition at a temperature of 35° C. to 100° C.; and photocuring the dried product of the resin composition.

An antireflection film of one embodiment described above can be provided through such a method for preparing an antireflection film.

Specifically, the antireflection film provided by the method for preparing an antireflection film is configured such that the hollow silica nanoparticles, the metal oxide nanoparticles, and the inorganic nanoparticles are distributed so as to be distinguishable from each other in the low refractive index layer, and thereby it can realize high scratch resistance and antifouling property while simultaneously having low reflectivity and high light transmittance.

The low refractive index layer may be formed by coating a resin composition for forming a low refractive index layer containing a photocurable compound or its (co)polymer, a fluorine-containing compound containing a photoreactive functional group, a photoinitiator, a hollow silica nanoparticle, a metal oxide nanoparticle, and an inorganic nanoparticle on the hard coating layer and drying the coated resin composition at a temperature of 35° C. to 100° C., or 50° C. to 95° C., or 60° C. to 90° C.

If the temperature for drying the resin composition for forming a low refractive index layer coated on the hard coating layer or the antiglare layer is less than 35° C., the antifouling property of the low refractive index layer formed as described above may be greatly lowered. Further, if the temperature for drying the resin composition for forming a low refractive index layer coated on the hard coating layer or the antiglare layer is greater than 100° C., in the process of preparing the low refractive index layer, the phase separation between the hollow silica nanoparticles, the metal oxide nanoparticles, and the inorganic nanoparticles in the low refractive index layer does not sufficiently occur and they are mixed, so that the scratch resistance and antifouling property of the low refractive index layer are lowered and the reflectivity can also be greatly increased.

By adjusting the difference in diameter between the inorganic nanoparticles, the metal oxide nanoparticles, and the hollow silica nanoparticles together with the drying temperature, in the process of drying the resin composition for forming a low refractive index layer coated on the hard coating layer or the antiglare layer, it is possible to form a low refractive index layer having properties such that phase separation occurs at the characteristic region described above.

Specifically, as the ratio of the average diameter of the inorganic nanoparticles to the average diameter of the hollow silica nanoparticles is 0.01 to 0.5, the hollow silica nanoparticles and the inorganic nanoparticles may exhibit mutually different uneven distribution or distribution patterns in the low refractive index layer. For example, the positions where each of the hollow silica nanoparticles and the inorganic nanoparticles is mainly distributed may be mutually different distances on the basis of the interface between the hard coating layer or the antiglare layer and the low refractive layer.

The average diameter of the hollow silica nanoparticles and the average diameter of the inorganic nanoparticles may be, respectively, the average values obtained by measuring and calculating the diameters of the hollow silica nanoparticles and the inorganic nanoparticles identified by a TEM photograph (for example, magnification of 25,000 times) of the antireflection film.

In this manner, as the regions where the hollow silica nanoparticles and the inorganic nanoparticles are mainly distributed are varied, the low refractive index layer has a unique internal structure and arrangement pattern of components, thereby having lower reflectivity. In addition, as the regions where the hollow silica nanoparticles and the inorganic nanoparticles are mainly distributed are varied, the surface properties of the low refractive index layer are also varied so that more improved scratch resistance and antifouling property can be realized.

On the contrary, when the difference between the diameter of the hollow silica nanoparticles and the diameter of the inorganic nanoparticles is not so large, the hollow silica nanoparticles and the inorganic nanoparticles aggregate with each other and uneven distribution or distribution according to the type of particles does not occur. Therefore, not only it is difficult to greatly lower the reflectivity of the antireflection film, but it may also be difficult to achieve the desired scratch resistance and antifouling property.

As described above, the inherent effects of the antireflection film of the embodiment, that is, the properties that can realize high scratch resistance and antifouling property while simultaneously having low reflectivity and high light transmittance, and can further enhance the screen sharpness of the display device, depend on the ratio of the average diameter between the hollow silica nanoparticles and the inorganic nanoparticles described above.

As the ratio of the average diameter of the inorganic nanoparticles to the average diameter of the hollow silica nanoparticles described above satisfies the above-mentioned conditions, the antireflection film can realize high scratch resistance and antifouling property while simultaneously having low reflectivity and high light transmittance. In order to more easily adjust the properties of the antireflection film and match the properties required in the field of application, the hollow silica nanoparticles and the inorganic nanoparticles having a predetermined average diameter may be used.

For example, in order for the antireflection film to realize more improved high scratch resistance and antifouling property while simultaneously having low reflectivity and high light transmittance, the average diameter of the hollow silica nanoparticles may be in a range of 20 nm to 100 nm. Further, the average diameter of the inorganic nanoparticles may be in the range of 1 nm to 30 nm.

Moreover, the ratio of the average diameter of the inorganic nanoparticles to the average diameter of the metal oxide nanoparticles may be 0.5 to 0.9. Consequently, in the low refractive index layer, as the regions where the metal oxide nanoparticles and the inorganic nanoparticles are mainly distributed in the low refractive index layer are varied, the low refractive index layer can have an inherent internal structure and arrangement pattern of components, thereby having lower reflectivity.

Specifically, as the ratio of the average diameter of the inorganic nanoparticles to the average diameter of the metal oxide nanoparticles satisfies the above-described range, the metal oxide nanoparticles in the low refractive index layer can be dispersed away from the interface between the hard coating layer or the antiglare layer and the low refraction layer.

More specifically, the average diameter of the metal oxide nanoparticles may be larger than the average diameter of the inorganic nanoparticles and smaller than the average diameter of the hollow silica nanoparticles. That is, the average diameter of the hollow silica nanoparticles, the metal oxide nanoparticles, and the inorganic nanoparticles can satisfy the following Equation 2.

Average Diameter of Inorganic Nanoparticles<Average Diameter of Metal Oxide Nanoparticles<Average Diameter of Hollow Silica Nanoparticles [Equation 2]

More specifically, the metal oxide nanoparticles may have longer diameters by 1 nm or more, or 5 nm to 20 nm, compared with the metal nanoparticles, and due to such difference in diameter, in the low refractive index layer formed on the hard coating layer or the antiglare layer, the inorganic nanoparticles can be mainly dispersed closer to the hard coating layer or the antiglare layer than the metal oxide nanoparticles. Thereby, the low refractive index layer realizes ultra-low reflectivity and at the same time improved mechanical properties such as scratch resistance.

In addition, the hollow silica nanoparticles may have longer diameters by 15 mm or more, 15 nm to 60 nm, or 30 nm to 55 nm than the metal oxide nanoparticles, and due to such difference in diameter, in the low refractive index layer formed on the hard coating layer or the antiglare layer, the metal oxide nanoparticles can be mainly dispersed closer to the hard coating layer or the antiglare layer than the hollow silica nanoparticles. Thereby, it is possible to realize improved scratch resistance and antifouling property on the surface of the low refraction layer.

Meanwhile, the step of drying the resin composition for forming a low refractive index layer coated on the hard coating layer at a temperature of 35° C. to 100° C. may be carried out for 10 seconds to 5 minutes, or 30 seconds to 4 minutes.

If the drying time is too short, the phase separation phenomenon between the inorganic nanoparticles, the metal oxide nanoparticles, and the hollow silica nanoparticles described above may not sufficiently occur. On the other hand, if the drying time is too long, the formed low refractive index layer may corrode the hard coating layer or the antiglare layer.

Meanwhile, the low refractive index layer can be produced from a photocurable coating composition containing a photopolymerizable compound or a (co)polymer thereof, a fluorine-containing compound containing a photoreactive functional group, hollow silica nanoparticles, metal oxide nanoparticles, inorganic nanoparticles, and a photoinitiator.

The low refractive index layer can be obtained by coating the photocurable coating composition onto a predetermined substrate and photocuring the coated product. The specific type and thickness of the substrate are not particularly limited, and a substrate known to be used in the production of the low refractive index layer or the antireflection film can be used without particular limitation.

The method and apparatus commonly used for coating the photocurable coating composition can be used without particular limitation. For example, a bar coating method, such as a Meyer bar method or the like, a gravure coating method, a 2-roll reverse coating method, a vacuum slot die coating method, a 2-roll coating method, or the like can be used.

The low refractive index layer may have a thickness of 1 nm to 300 nm, or 50 nm to 200 nm. Accordingly, the thickness of the photocurable coating composition coated onto the predetermined substrate can be about 1 nm to 300 nm, or 50 nm to 200 nm.

In the step of photocuring the photocurable coating composition, ultraviolet light or visible light having a wavelength of 200 nm to 400 nm can be irradiated, and the amount of exposure is preferably 100 mJ/cm$^2$ to 4000 mJ/cm$^2$. The exposure time is not particularly limited, and can be appropriately varied depending on the exposure apparatus used, the wavelength of the irradiated light, or the amount of exposure.

Further, in the step of photocuring the photocurable coating composition, nitrogen purging or the like may be performed to apply nitrogen atmosphere conditions.

Specific contents of the photocurable compound, the hollow silica nanoparticles, the metal oxide nanoparticles, the fluorine-containing compounds containing the photoreactive functional group, and the inorganic nanoparticles may include those given above in the antireflection film of the embodiments.

Each of the hollow silica particles, the metal oxide nanoparticles, and the inorganic nanoparticles may be contained in the composition as a colloidal phase dispersed in a predetermined dispersion medium. The respective colloidal phases including the hollow silica particles, the metal oxide nanoparticles, and the inorganic nanoparticles may include an organic solvent as a dispersion medium.

The colloidal content of each of the hollow silica nanoparticles, the metal oxide nanoparticles, and the inorganic nanoparticles can be determined in consideration of the respective content ranges of the hollow silica nanoparticles, the metal oxide nanoparticles, and the inorganic nanoparticles in the photocurable coating composition, the viscosity of the photocurable coating composition, and the like. For example, it may include 15% by weight to 70% by weight of the hollow silica nanoparticles, 5% by weight to 60% by weight of the metal oxide nanoparticles, and 3% by weight to 40% by weight by weight of the inorganic nanoparticles in the colloidal phase. More specifically, 10 parts by weight to 50 parts by weight of the metal oxide nanoparticles and 10 parts by weight to 30 parts by weight of the inorganic nanoparticles may be contained based on 100 parts by weight of the hollow silica nanoparticles.

Herein, examples of the organic solvent in the dispersion medium include: alcohols such as methanol, isopropyl alcohol, ethylene glycol butanol, and the like; ketones such as methyl ethyl ketone, methyl isobutyl ketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butyrolactone, and the like; ethers such as tetrahydrofuran, 1,4-dioxane, and the like; or a mixture thereof.

As the photopolymerization initiator, any compound known to be usable in a photocurable resin composition may be used without particular limitation. Specifically, a benzophenone-based compound, an acetophenone-based based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound. If the amount of the photopolymerization initiator is too small, the photopolymerization initiator may not be cured in the photocuring step of the photocurable coating composition to generate a residual material. If the amount of the photopolymerization initiator is too large, the unreacted initiator may remain as impurities or the crosslinking density may be lowered, and thus the mechanical properties of the resulting film may be deteriorated, or the reflectivity may be greatly increased.

Meanwhile, the photocurable coating composition may further include an organic solvent.

Non-limiting examples of the organic solvent include ketones, alcohols, acetates, and ethers, or a mixture of two or more thereof.

Specific examples of such organic solvent include ketones such as methyl ethyl ketone, methyl isobutyl ketone, acetylacetone, or isobutyl ketone; alcohols such as methanol, ethanol, diacetone alcohol, n-propanol, i-propanol, n-butanol, i-butanol, or t-butanol; acetates such as ethyl acetate, i-propyl acetate, or polyethylene glycol monomethyl ether acetate; ethers such as tetrahydrofuran and propylene glycol monomethyl ether; or a mixture of two or more thereof.

The organic solvent may be added at the time of mixing the respective components contained in the photocurable coating composition, or may be added to the photocurable coating composition while the respective components are added in a state of being dispersed or mixed in the organic solvent. If the content of the organic solvent in the photocurable coating composition is too small, the flowability of the photocurable coating composition may be reduced, resulting in defects, such as generation of stripes in the finally produced film, or the like. Further, if the organic solvent is added in an excess amount, the solid content is lowered, the physical properties and surface properties of the film may be deteriorated due to insufficient coating and film formation, and defects may occur during the drying and curing processes. Accordingly, the photocurable coating composition may include an organic solvent such that the concentration of the total solids of the components contained is 1% by weight to 50% by weight, or 2% by weight to 20% by weight.

The hard coating layer or the antiglare layer can be used without particular limitation as long as it is a material known to be usable for the antireflection film.

Specifically, the preparation method of the antireflection film further includes coating a polymer resin composition for forming a hard coating layer or an antiglare layer including a photocurable compound or a (co)polymer thereof, a photoinitiator, and an antistatic agent on the substrate, and photocuring the coated product. The hard coating layer or the antiglare layer can be formed through the above steps.

The components used for forming the hard coating layer or the antiglare layer are the same as those described above with respect to the antireflection film of one embodiment.

Further, the resin composition for forming the hard coating layer or the antiglare layer may further include at least one compound selected from the group consisting of an alkoxysilane-based oligomer and a metal alkoxide-based oligomer.

The method and apparatus commonly used for coating the resin composition for forming the hard coating layer or the antiglare layer can be used without particular limitation. For example, a bar coating method, such as Meyer bar method or the like, a gravure coating method, a 2-roll reverse coating method, a vacuum slot die coating method, a 2-roll coating method, or the like can be used.

In the step of photocuring the polymer resin composition for forming the hard coating layer or the antiglare layer, ultraviolet light or visible light having a wavelength of 200 nm to 400 nm can be irradiated, and the amount of exposure is preferably 100 mJ/cm$^2$ to 4000 mJ/cm$^2$. The exposure time is not particularly limited, and can be appropriately varied depending on the exposure apparatus used, the wavelength of the irradiated light, or the amount of exposure. Further, in the step of photocuring the photocurable coating composition for forming the hard coating layer or the antiglare layer, nitrogen purging or the like may be performed.

Advantageous Effects

According to the present invention, an antireflection film being capable of realizing high scratch resistance and antifouling property while simultaneously having low reflectivity and high light transmittance, and further being capable of enhancing screen sharpness of a display device, and a method for preparing the antireflection film, may be provided.

DETAILED DESCRIPTION OF THE EMBODIMENTS

The present invention will be described by way of examples. However, the following examples are for illustrative purposes only and are not intended to limit the scope of the present invention thereto.

PREPARATION EXAMPLE

Preparation Example: Preparation of Hard Coating Layer

A salt type of antistatic hard coating solution (manufactured by KYOEISHA Chemical, solid content: 50 wt %, product name: LJD-1000) was coated onto a triacetyl cellulose (TAC) film with a #10 Meyer bar, dried at 90° C. for 1 minute, and then irradiated with ultraviolet light of 150 mJ/cm$^2$ to prepare a hard coating film having a thickness of about 5 to 6 μm.

Examples 1 to 5: Preparation of Antireflection Film

Examples 1 to 3

(1) Preparation of a Photocurable Coating Composition for Preparing a Low Refractive Index Layer 35 wt % of hollow silica nanoparticles (average particle diameter: about 50 to 60 nm), 10 wt % of TiO$_2$ nanoparticles (average particle diameter: about 17 nm, average length: about 30 nm), 10 wt % of solid-type silica nanoparticles (average particle diameter: about 12 nm), 5 wt % of a first fluorine-containing compound (X-71-1203M, Shin-Etsu Chemical), 10 wt % of a second fluorine-containing compound (RS-537, DIC Corporation), 25 wt % of pentaerythritol triacrylate (PETA), and 5 wt % of an initiator (Irgacure 127, Ciba) were diluted in an MIBK (methyl isobutyl ketone) solvent so that the solid content concentration became 4 wt %.

(2) Preparation of Low Refractive Index Layer and Antireflection Film

The photocurable coating composition obtained as described above was coated on the hard coating film of the above preparation example to a thickness of about 180 nm to 200 nm with a #4 Meyer bar, and dried and cured at the pressure, temperature, and time shown in Table 1 below, respectively. At the time of curing, ultraviolet light of 252 mJ/cm$^2$ was irradiated to the dried coating under a nitrogen purge.

Examples 4 to 5

(1) Preparation of a Photocurable Coating Composition for Preparing a Low Refractive Index Layer 30 wt % of hollow silica nanoparticles (average particle diameter: about 60 to 70 nm), 15 wt % of TiO$_2$ nanoparticles (average particle diameter: about 17 nm, average length: about 30 nm), 10 wt % of solid-type silica nanoparticles (average particle diameter: about 12 nm), 3 wt % of a first fluorine-containing compound (X-71-1203M, Shin-Etsu Chemical), 17 wt % of a second fluorine-containing compound (RS-537, DIC Corporation), 20 wt % of pentaerythritol triacrylate (PETA), and 5 wt % of an initiator (Irgacure 127, Ciba) were diluted in an MIBK (methyl isobutyl ketone) solvent so that the solid content concentration became 4 wt %.

(2) Preparation of Low Refractive Index Layer and Antireflection Film

The photocurable coating composition obtained as described above was coated onto the hard coating film of the above preparation example to a thickness of about 180 nm to 200 nm with a #4 Meyer bar, and dried and cured at the pressure, temperature, and time shown in Table 1 below, respectively. At the time of curing, ultraviolet light of 252 mJ/cm² was irradiated to the dried coating under a nitrogen purge.

TABLE 1

Preparation conditions of antireflection film of Examples

| Category | Drying temperature (° C.) | Drying time |
|---|---|---|
| Example 1 | 60 | 1 min |
| Example 2 | 90 | 1 min |
| Example 3 | 60 | 2 min |
| Example 4 | 60 | 1 min |
| Example 5 | 90 | 1 min |

Comparative Examples 1 to 3: Preparation of Antireflection Film

Comparative Example 1

The antireflection film was prepared in the same manner as in Example 1, except that a composition in which 65 wt % of hollow silica nanoparticles (average diameter: about 60 to 70 nm), 5 wt % of a first fluorine-containing compound (X-71-1203M, Shin-Etsu Chemical), 10 wt % of a second fluorine-containing compound (RS-537, DIC Corporation), 15 wt % of pentaerythritol triacrylate (PETA), and 5 wt % of an initiator (Irgacure 127, Ciba) were diluted in an MIBK (methyl isobutyl ketone) solvent so that the solid content concentration became 3%, and was used as a photocurable coating composition for preparing a low refractive index layer.

Comparative Example 2

The antireflection film was prepared in the same manner as in Example 1, except that a composition in which 50 wt % of hollow silica nanoparticles (average diameter: about 50 to 60 nm), 10 wt % of solid-type silica nanoparticles (average particle diameter: about 12 nm), 3 wt % of a first fluorine-containing compound (X-71-1203M, Shin-Etsu Chemical), 15 wt % of a second fluorine-containing compound (RS-537, DIC Corporation), 17 wt % of pentaerythritol triacrylate (PETA), and 5 wt % of an initiator (Irgacure 127, Ciba) were diluted in an MIBK (methyl isobutyl ketone) solvent so that the solid content concentration became 3 wt %, and was used as a photocurable coating composition for preparing a low refractive index layer.

Comparative Example 3

The antireflection film was prepared in the same manner as in Example 2, except that a composition in which 50 wt % of hollow silica nanoparticles (average diameter: about 50 to 60 nm), 10 wt % of solid-type silica nanoparticles (average particle diameter: about 12 nm), 5 wt % of a first fluorine-containing compound (X-71-1203M, Shin-Etsu Chemical), 13 wt % of a second fluorine-containing compound (RS-537, DIC Corporation), 17 wt % of pentaerythritol triacrylate (PETA), and 5 wt % of an initiator (Irgacure 127, Ciba) were diluted in an MIBK (methyl isobutyl ketone) solvent so that the solid content concentration became 3 wt %, and was used as a photocurable coating composition for preparing a low refractive index layer.

Experimental Examples: Measurement of Physical Properties of Antireflection Films The following experiments were conducted for the antireflection films obtained in Examples and Comparative Examples.

1. Measurement of Average Reflectivity

The average reflectivity of the antireflection films obtained in the examples and comparative examples shown in a visible light region (380 to 780 nm) was measured using a Solidspec 3700 (SHIMADZU) apparatus, and the results are shown in Table 2 below.

2. Measurement of Scratch Resistance

The surfaces of the antireflection films obtained in the examples and comparative examples were rubbed while applying a load to steel wool (area of 2 cm²) and reciprocating ten times at a speed of 27 rpm. The maximum load at which one or less scratches with a size of 1 cm or less were generated, as observed with the naked eye, was measured, and the results are shown in Table 2 below.

3. Measurement of Antifouling Property

Straight lines with a length of 5 cm were drawn with a red permanent marker on the surface of the antireflection films obtained in the examples and comparative examples. Then, the antifouling property was measured by confirming the number of times of erasing when rubbed with a nonwoven cloth. The results are shown in Table 2 below.

<Measurement Standard>
○: Erase when rubbing 10 times or less
Δ: Erase when rubbing 11 to 20 times
X: Erase when rubbing 20 times or more

TABLE 2

Results of Experiments for Examples and Comparative Examples

| Category | Average Reflectivity (%) | Scratch Resistance (g) | Antifouling Property |
|---|---|---|---|
| Example 1 | 0.27 | 300 | ○ |
| Example 2 | 0.25 | 300 | ○ |
| Example 3 | 0.26 | 300 | ○ |
| Example 4 | 0.21 | 300 | ○ |
| Example 5 | 0.23 | 300 | ○ |
| Comparative Example 1 | 0.28 | 100 | X |
| Comparative Example 2 | 0.65 | 400 | ○ |
| Comparative Example 3 | 0.62 | 400 | ○ |

As shown in Table 2, the antireflection films of Examples 1 to 5, in which three kinds of particles (hollow silica nanoparticles, TiO₂ nanoparticles, and solid-type silica nanoparticles) were contained in the low refractive index layer could realize high scratch resistance and antifouling property while simultaneously exhibiting low reflectivity of 0.30% or less in the visible light range.

In contrast, it was confirmed that the low refractive index layer of the antireflection film of Comparative Example 1 containing only hollow silica nanoparticles exhibited lower scratch resistance as compared with the examples, and the antifouling property was also decreased.

Further, it was confirmed that, in the low refractive index layers of the antireflection films of Comparative Examples 2 and 3, the hollow silica nanoparticles and the solid silica nanoparticles were included so that the scratch resistance and antifouling properties were high. However, the average reflectivity was measured to be higher than 0.6% and it was difficult to realize ultra-low reflectivity.

That is, in the case of the examples, as three kinds of particles were dispersed in the low refractive index layer, it was confirmed that the ultra-low reflectivity of 0.30% or less could be achieved, and at the same time, the scratch resistance and antifouling property could be maintained at an appropriate level.

4. Phase Separation

The polarization ellipticity of the low refractive index layer obtained in each of the examples and comparative examples was measured by an ellipsometry method.

Specifically, the ellipticity measurement of the low refractive index layer obtained in each of the examples and comparative examples was carried out at an incident angle of 70° over a wavelength range of 380 nm to 1000 nm by using a J. A. Woollam Co. M-2000 apparatus. The measured ellipsometry data ($\Psi$, $\Delta$) was fitted to a Cauchy model of the following General Formula 1 using CompleteEASE software so that the MSE became 5 or less. The values of Cauchy parameter A, substantially matching the refractive index values, are shown in Table 3 below.

$$n(\lambda) = A + \frac{B}{\lambda^2} + \frac{C}{\lambda^4} \quad \text{[General Formula 1]}$$

In the above General Formula 1, n($\lambda$) is a refractive index at a wavelength $\lambda$, $\lambda$ is in a range of 300 nm to 1800 nm, and A, B, and C are Cauchy parameters.

TABLE 3

Results of Experiments for Examples and Comparative Examples

| Category | Example 1 | Example 2 | Example 3 | Example 4 | Example 5 | Comparative Example 1 | Comparative Example 2 | Comparative Example 3 |
|---|---|---|---|---|---|---|---|---|
| First region | 1.356 | 1.314 | 1.303 | 1.238 | 1.277 | 1.315 | 1.338 | 1.395 |
| Second region | 1.603 | 1.620 | 1.547 | 1.558 | 1.583 | — (not analyzed) | — (not analyzed) | — (not analyzed) |
| Third region | 1.525 | 1.520 | 1.516 | 1.503 | 1.507 |  | 1.521 | 1.510 |

As shown in Table 3, it was confirmed that in the low refractive index layer of the antireflection film of Examples 1 to 5, the values of Cauchy parameter A were analyzed as the distinguishable three regions by the ellipsometry method, and three regions having different refractive indexes were formed in the low refractive index layer.

Specifically, it was confirmed through the refractive index data of each region and the refractive index of each of the solid-type silica nanoparticles (refractive index: 1.45 to 1.6), metal oxide nanoparticles (refractive index: 1.7 or more), and hollow silica nanoparticles (refractive index: 1.2 to 1.45) that the phase separation occurred into three regions where each of solid-type silica nanoparticles, metal oxide nanoparticles, and hollow silica nanoparticles was mainly distributed.

In addition, depending on the particle size of the solid-type silica nanoparticles, the metal oxide nanoparticles, and the hollow silica nanoparticles, for the larger particle size, the phase separation occurred at the upper part of the low refractive index layer, and for the smaller particle size, the phase separation occurred at the lower part of the low refractive index layer. In consideration of this, it was confirmed that three regions were formed from the top to the bottom of the low refractive index layer in the order of the hollow silica nanoparticles, the metal oxide nanoparticles, and the solid-type silica nanoparticles.

Meanwhile, in the case of Comparative Example 1, it was confirmed by the ellipsometry method that only one region was formed, and thus only a single region in which hollow silica nanoparticles were mainly distributed in the low refractive index layer was formed. In the case of Comparative Examples 2 and 3, it was confirmed by the ellipsometry method that two regions were formed, and thus hollow silica nanoparticles and solid-type silica nanoparticles contained in the low refractive index layer were phase-separated into two regions, thereby forming two regions having different reflective indexes.

That is, in the case of the examples, it was confirmed that three kinds of particles were phase-separated into three regions in the low refractive index layer, thereby forming three regions having different refractive indexes, whereby ultra-low reflectivity of 0.30% or less could be realized and at the same time the scratch resistance and antifouling property could be maintained at appropriate levels.

The invention claimed is:

1. An antireflection film comprising:
a hard coating layer or an antiglare layer; and
a low refractive index layer formed on one side of the hard coating layer or the antiglare layer and including a binder resin, and hollow silica nanoparticles, metal oxide nanoparticles, and inorganic nanoparticles dispersed in the binder resin,
wherein a first region containing the hollow silica nanoparticles, a second region containing the metal oxide nanoparticles, and a third region containing the inorganic nanoparticles are present in the low reflective index layer,
the first region, the second region, and the third region satisfy the following Equation 1:

Refractive Index (n1) of First Region<Refractive Index (n3) of Third Region<Refractive Index (n2) of Second Region  [Equation 1]

wherein n1, n2, and n3 are refractive indexes obtained by carrying out Ellipsometry measurement at an incident angle of 70° over a wavelength range of 380 nm to 1000 nm, and wherein average diameters of the hollow silica nanoparticle, the metal oxide nanoparticle, and the inorganic nanoparticle satisfy the following Equation 2:

Average Diameter of Inorganic Nanoparticles<Average Diameter of Metal Oxide Nanoparticles<Average Diameter of Hollow Silica Nanoparticles  [Equation 2].

2. The antireflection film of claim 1, wherein the first region includes 70% by volume or more of the entire hollow silica nanoparticles, the second region includes 70% by volume or more of the entire metal oxide nanoparticles, and the third region includes 70% by volume or more of the entire inorganic nanoparticles.

3. The antireflection film of claim 1, wherein in the low refractive index layer, the third region is located closer to the interface between the hard coating layer or the antiglare layer and the low refractive index layer, compared to the second region, and the second region is located closer to the interface between the hard coating layer or the antiglare layer and the low refractive layer, compared to the first region.

4. The antireflection film of claim 1, wherein
the first region, the second region, and the third region in the low refractive index layer are present in a continuous phase by one binder resin.

5. The antireflection film of claim 1, wherein
the low refractive index layer is obtained by coating with a resin composition comprising a binder resin, a hollow silica nanoparticle, a metal oxide nanoparticle, and an inorganic nanoparticle.

6. The antireflection film of claim 1, wherein
a ratio of the average diameter of the inorganic nanoparticles to the average diameter of the metal oxide nanoparticles is 0.5 to 0.9.

7. The antireflection film of claim 1, wherein
a ratio of the average diameter of the inorganic nanoparticles to the average diameter of the hollow silica nanoparticles is 0.01 to 0.5.

8. The antireflection film of claim 1, wherein
the refractive index of the first region is less than 1.4, the refractive index of the second region is more than 1.55, and the refractive index of the third region is more than 1.4 and less than 1.55.

9. The antireflection film of claim 1, wherein
thicknesses of the first region, the second region, and the third region are respectively 10 nm to 200 nm.

10. The antireflection film of claim 1, wherein
each of the inorganic nanoparticles, the metal oxide nanoparticles, and the hollow silica nanoparticles has on the surface thereof at least one reactive functional group selected from the group consisting of a (meth) acrylate group, an epoxide group, a vinyl group, and a thiol group.

11. The antireflection film of claim 1, wherein
the inorganic nanoparticles include solid-type silica nanoparticles or antimony-doped tin oxide nanoparticles.

12. The antireflection film of claim 1, wherein
the antireflection film exhibits an average reflectivity of 0.3% or less in the visible light wavelength band of 380 nm to 780 nm.

13. The antireflection film of claim 1, wherein
the binder resin contained in the low refractive index layer includes a crosslinked (co)polymer between a (co) polymer of a photopolymerizable compound and a fluorine-containing compound containing a photoreactive functional group.

14. The antireflection film of claim 13, wherein
the binder resin includes 20 parts by weight to 300 parts by weight of the fluorine-containing compound containing a photoreactive functional group based on 100 parts by weight of the (co)polymer of a photopolymerizable compound.

15. A method for preparing an antireflection film, comprising steps of:
coating a resin composition for forming a low refractive index layer containing a photocurable compound or its (co)polymer, a fluorine-containing compound containing a photoreactive functional group, a photoinitiator, hollow silica nanoparticles, metal oxide nanoparticles, and inorganic nanoparticles on a hard coating layer or an antiglare layer, and drying the coated product at a temperature of 35° C. to 100° C.; and
photocuring the dried product of the resin composition, wherein an average diameter of the hollow silica nanoparticles, the metal oxide nanoparticles, and the inorganic nanoparticles satisfy the following Equation 2:

Average Diameter of Inorganic Nanoparticles<Average Diameter of Metal Oxide Nanoparticles<Average Diameter of Hollow Silica Nanoparticles [Equation 2].

16. The method for preparing an antireflection film of claim 15, wherein
the step of drying the resin composition for forming a low refractive index layer coated on the hard coating layer or the antiglare layer at a temperature of 35° C. to 100° C. is carried out for 10 seconds to 5 minutes.

17. The method for preparing an antireflection film of claim 15, wherein
a ratio of the average diameter of the inorganic nanoparticles to the average diameter of the metal oxide nanoparticles is 0.5 to 0.9.

18. The method for preparing an antireflection film of claim 15, wherein
a ratio of the average diameter of the inorganic nanoparticles to the average diameter of the hollow silica nanoparticles is 0.01 to 0.5.

* * * * *